United States Patent
Greboval et al.

(10) Patent No.: US 11,134,677 B2
(45) Date of Patent: Oct. 5, 2021

(54) DISINFECTING COMPOSITION

(71) Applicant: GOJO Industries, Inc., Akron, OH (US)

(72) Inventors: Elodie Greboval, La Ferte sous Jouarre (FR); Kamel El Yacoubi, Meaux (FR); Anne Matsuda, Bailly romainvilliers (FR); Magali Moreau, Lesigny (FR); Johanna Torest, Chevilly-Larue (FR)

(73) Assignee: GOJO Industries, Inc., Akron, OH (US)

( * ) Notice: Subject to any disclaimer, the term of this patent is extended or adjusted under 35 U.S.C. 154(b) by 203 days.

(21) Appl. No.: 16/343,019

(22) PCT Filed: Oct. 21, 2016

(86) PCT No.: PCT/IB2016/001688
§ 371 (c)(1),
(2) Date: Apr. 18, 2019

(87) PCT Pub. No.: WO2018/073616
PCT Pub. Date: Apr. 26, 2018

(65) Prior Publication Data
US 2020/0054007 A1 Feb. 20, 2020

(51) Int. Cl.
*A01N 31/02* (2006.01)
(52) U.S. Cl.
CPC .................. *A01N 31/02* (2013.01)
(58) Field of Classification Search
CPC ..................................... A01N 31/02

USPC ......................................................... 514/724
See application file for complete search history.

(56) References Cited

U.S. PATENT DOCUMENTS

| 6,479,456 B1 | 11/2002 | Holzner |
| 2014/0134269 A1 | 5/2014 | Ijaz et al. |

FOREIGN PATENT DOCUMENTS

| DE | 3723990 | 2/1988 |
| EP | 2371347 | 10/2011 |
| JP | 2003081709 A | 3/2003 |
| JP | 2007131594 A | 5/2007 |
| JP | 2016125048 A | 7/2016 |
| WO | 2011100665 | 8/2011 |

OTHER PUBLICATIONS

Unknown: "Certification Process Natural Detergents and Natural Detergents Made with Organic", Nov. 25, 2015 (Nov. 25, 2015), XP055334578, Retrieved from the Internet: URL:http://www.ecocert.com/sites/default/files/u3/TS004(GD)v03en-Detergents-Certification-Process.pdf [retrieved on Jan. 12, 2017].

*Primary Examiner* — Kristin A Vajda
(74) *Attorney, Agent, or Firm* — Calfee, Halter & Griswold LLP

(57) ABSTRACT

A disinfecting composition for killing pathogens on various surfaces is provided. The disinfecting composition is environmentally friendly and is certified natural according to the ECOCERT certification for detergents. The disinfecting composition generally includes one or more Ci-8 alcohols and at least three surfactants. The disinfecting composition passes one or more of the following European standards at a contact time of less than or equal to about 1 minute: EN 13697, EN 13727, EN 1275, EN 1650, and EN 13624.

20 Claims, No Drawings

DISINFECTING COMPOSITION

BACKGROUND

Disinfecting or sanitizing compositions have become increasingly popular in the health care industry as well as with the general public for providing antimicrobial effectiveness. Generally, these disinfecting or sanitizing compositions include alcohol or other antimicrobial agents which kill a wide array of microorganisms that may be present on the any number of surfaces. Compositions that kill fungi, bacteria, and viruses and are also safe for human contact are particularly important.

It has become increasingly popular to design compositions that are natural or organic as such compositions are thought to be safer for human use and more environmentally friendly. There is a continuing need for disinfecting products that are both environmentally friendly and have improved efficacy against various bacterial, fungicidal, and yeasticidal strains.

SUMMARY

According to some exemplary embodiments, a disinfecting composition is provided. The disinfecting composition comprises at least three surfactants and at least about 20 wt. % of one or more $C_{1-8}$ alcohols. The disinfecting composition passes one or more of the following European standards at a contact time of less than or equal to about 1 minute: EN 13697, EN 13727, EN 1275, EN 1650, and EN 13624. The disinfecting composition is certified as a natural detergent under ECOCERT standards In some exemplary embodiments, the at least three surfactants comprise at least one anionic surfactant, at least one nonionic surfactant, and at least one amphoteric surfactant. In some exemplary embodiments, the surfactants contain one or more of a betaine group, a sulfate group, or a glucose group and can be one or more of sodium laureth sulfate, cocamidopropyl betaine, and a $C_8$-$C_{16}$ alkylpolyglucoside. In some exemplary embodiments, all surfactants are from natural origin as defined by ECOCERT.

In some exemplary embodiments, the disinfecting composition passes all of the following European standards at a contact time of less than or equal to about 1 minute: EN 13697, EN 13727, EN 1275, EN 1650, and EN 13624.

In some exemplary embodiments, the $C_{1-8}$ alcohol is one or more of methanol, ethanol, propanol, butanol, pentanol, hexanol, and isomers and mixtures thereof.

In some exemplary embodiments, the $C_{1-8}$ alcohols is present in an amount from about 20.0 to about 70.0 wt. %, or from about 35.0 to about 50.0 wt. %, based on the weight of the disinfecting composition.

In some exemplary embodiments, the disinfecting composition further comprises a pH adjuster, which can be an organic acid, such as citric acid. In some exemplary embodiments, the pH adjuster is present in an amount from 0.05 to about 5.0 wt. %, based on the total weight of the disinfecting composition.

In some exemplary embodiments, the disinfecting composition further comprises a chelating agent, which can comprise L-glutamic acid N,N-diacetic acid, tetrasodium salt (GLDA). In some exemplary embodiments, the chelating agent is present in an amount from about 0.001 to about 3.0 wt. %, based on the total weight of the disinfecting composition.

In some exemplary embodiments, the disinfecting composition further comprises a solubilizing agent, such as propylene glycol. In some exemplary embodiments, the solubilizing agent is present in an amount from about 0.01 to about 5.0 wt. %, based on the total weight of the disinfecting composition.

In some exemplary embodiments, the disinfecting composition further comprises a carrier, such as water.

In some exemplary embodiments, the individual surfactants are present an amount below about 5.0 wt. %, or about 3.5 wt. %, or about 2.8 wt. %, or about 2.0 wt. %, based on the total weight of the disinfecting composition.

In some exemplary embodiments, the total quantity of ethoxylated surfactants does not exceed 50% or about 30% of the total quantity of surfactants, based on the weight of the alcohol.

In some exemplary embodiments, the disinfecting composition must only be labeled GHS/H319 (irritating to eyes) and GHS02/H225 (flammable) or only GHS/H319 (irritating to eyes) under the Globally Harmonized System. In some exemplary embodiments, the disinfecting composition does not need to be environmentally labeled under the Globally Harmonized System.

In some exemplary embodiments, the disinfecting composition passes the EN 1276 and EN 13727 standard for bacterial efficacy at 40% and 80% concentration In some exemplary embodiments, the disinfecting composition passes the EN 1650 and the EN 13624 standard for fungicidal efficacy at 80% concentration.

In some exemplary embodiments, the disinfecting composition passes the EN 13697 standard for bacterial & fungicidal/yeasticidal efficacy at 100% concentration In some exemplary embodiments, the disinfecting composition is essentially free of hydrogen peroxide, peracetic acid, and/or phosphonate surfactants.

According to some exemplary embodiments, a disinfecting composition is provided which is certified as a natural detergent according to the ECOCERT standard. The disinfecting composition comprises at least about 20 wt. % of one or more $C_{1-8}$ alcohols, one or more chelating agents, and at least one anionic surfactant, at least one non-ionic surfactant, and at least one amphoteric surfactant. The disinfecting composition passes one or more of the following European standards at a contact time of less than or equal to about 1 minute: EN 13697, EN 13727, EN 1275, EN 1650, and EN 13624.

According to some exemplary embodiments, a disinfecting composition is provided which is certified as a natural detergent according to the ECOCERT standard. The disinfecting composition comprises at least about 20 wt. % of one or more $C_{1-8}$ alcohols, one or more pH adjusters, and at least three surfactants where each of the surfactants has one or more of a betaine group, a sulfate group, and a glucose group. The disinfecting composition passes one or more of the following European standards at a contact time of less than or equal to about 1 minute: EN 13697, EN 13727, EN 1275, EN 1650, and EN 13624.

DETAILED DESCRIPTION

Unless otherwise defined, all technical and scientific terms used herein have the same meaning as commonly understood by one of ordinary skill in the art to which this application pertains. Although other methods and materials similar or equivalent to those described herein may be used in the practice or testing of the exemplary embodiments, exemplary suitable methods and materials are described below. In case of conflict, the definitions included in the present specification will control. In addition, the materials, methods, and examples are illustrative only and not intended to be limiting of the general inventive concepts.

The terminology as set forth herein is for description of the exemplary embodiments only and should not be construed as limiting the application as a whole. Unless otherwise specified, "a," "an," "the," and "at least one" are used interchangeably. Furthermore, as used in the description of the application and the appended claims, the singular forms "a," "an," and "the" are inclusive of their plural forms, unless contradicted by the context surrounding such.

The term about "about" means within +/−10% of a value, or more preferably, within +/−5% of a value, and most preferably within +/−1% of a value.

The phrase "log kill" or "log reduction" refers to a logarithmic reduction of colony forming units (CFUs) on a given location. Logarithm scales are based on a base of 10 raised to a given power (i.e., Log 4 means $10^4$ or 10,000). In terms of reduction, a reduction of 1-log (90%) reduces the CFUs on a particular area from 1,000,000 to 100,000, a reduction of 2-log (99%) reduces the CFUs on a particular area from 1,000,000 to 10,000, a reduction of 3-log (99.9%) reduces the CFUs on a particular area from 1,000,000 to 1,000, and a reduction of 4-log (99.99%) reduces the CFUs on a particular area from 1,000,000 to 100.

The general inventive concepts relate to a disinfecting composition that can be used on a wide variety of surfaces to kill or reduce the presence of pathogens such as bacteria, yeast, and fungi.

In some exemplary embodiments, the individual components of the disinfecting composition are chosen to ensure that the overall composition complies with ECOCERT labeling standards. ECOCERT is an organic certification organization that certifies and inspects various products including food/food products, cosmetics, detergents, perfumes, and textiles. ECOCERT has two levels of certification for disinfecting/detergent compositions, including natural detergent and natural detergent made with organic level. Generally, to be natural detergent certified, a composition must meet the following conditions: (1) the composition contains a maximum of 5% of synthetic ingredients in the restrictive list and (2) no environmentally risky statement must accompany the final product. Generally, to be natural, with organic level, detergent certified, a composition must meet the following conditions: (1) 95% of the ingredients in the composition must be of natural origin, (2) 10% of the ingredients in the composition must come from organic farming, and (3) no risky statements must accompany the final product. In some exemplary embodiments, the disinfecting composition is certified as a natural detergent by ECOCERT Greenlife according to the ECOCERT standard available at http://detergents.ecocert.com/en. In some exemplary embodiments, the disinfecting composition is certified as a natural detergent with organic level by ECOCERT Greenlife according to the ECOCERT standard available at http://detergents.ecocert.com/en.

The disinfecting composition according to the exemplary embodiments disclosed herein may be employed on a wide variety of surfaces or substrates, such as, for example, hard surfaces, soft surfaces, non-living (inanimate) surfaces, soil, porous, and non-porous surfaces. The disinfecting composition may be employed to disinfect or otherwise sanitize inanimate objects such as instruments, medical equipment, furniture, handrails, and the like. In some exemplary embodiments, the disinfecting composition can be used in ambulances, bathrooms, healthcare facilities, retirement homes, daycare centers, and on industrial premises.

The physical form of the disinfectant composition is not particularly limited, and in one or more embodiments, the composition may be presented as a liquid that is poured, pumped, sprayed, or otherwise dispensed; a gel; an aerosol; a solid bar or stick; or a foam, including both aerosol and non-aerosol foams. A wide variety of vehicles may be used to deliver the disinfecting composition, such as, for example pads, tissue, towel, sticks, aerosol dispersers, pump sprays, trigger sprays, canisters, foam pumps, wipes, and the like. The disinfecting composition may be applied to the surface before, during, or after surface cleaning.

In some exemplary embodiments, the disinfecting composition is an alcohol-based composition comprising an alcohol or combination of alcohols. By alcohol, it is meant any organic compound which has a hydroxyl functional group bonded to a saturated carbon atom. Alcohol has antimicrobial properties and has the ability to kill many forms of bacteria, fungi, and viruses. In some embodiments, the alcohol is a $C_{1-8}$ alcohol, i.e. an alcohol containing 1 to 8 carbon atoms. Such alcohols may be referred to as lower alkanols. Examples of lower alkanols include, but are not limited to, methanol, ethanol, propanol, butanol, pentanol, hexanol, and isomers and mixtures thereof. The alcohol may be either pure alcohol or denatured alcohol. The alcohol can further be linear or branched. For example, the branched alcohol can be isopropanol, isoamyl alcohol, 2-methyl-1-pentanol, 2-methyl-1-butanol, and the like. In one or more exemplary embodiments, the alcohol comprises ethanol, propanol, or butanol, or isomers or mixtures thereof. In one or more exemplary embodiments, the alcohol comprises isopropanol. In other exemplary embodiments, the alcohol comprises ethanol. In one or more exemplary embodiment, the disinfecting composition comprises a mixture of alcohols. In one or more exemplary embodiments, the disinfecting composition comprises a mixture of ethanol and isopropanol.

While $C_{1-8}$ alcohols are discussed herein, it is envisioned that longer alcohols (alcohols with more than 8 carbon atoms), or alcohols with various other functional groups would be similarly suitable. These longer alcohols can further be linear or branched. For example, in addition to the hydroxyl functional group, the alcohol may further contain esters, carboxylic acids, ethers, amides, amines, alkyl halides, phenyls, as well as other carbonyl-containing functional groups. The alcohol can also be an aliphatic alcohol or an aromatic alcohol.

In some exemplary embodiments, the disinfecting composition is an alcohol-water based composition, comprising one or more $C_{1-8}$ alcohols and water. These systems are often referred to as hydroalcoholic systems.

In some exemplary embodiments, the disinfecting composition comprises at least about 10.0 percent by weight (wt. %) $C_{1-8}$ alcohol, or at least about 20.0 wt. % $C_{1-8}$ alcohol, or at least about 35.0 wt. % $C_{1-8}$ alcohol, or at least 40.0 wt. % $C_{1-8}$ alcohol, or at least 42.0 wt. % $C_{1-8}$ alcohol, or at least 48.0 wt. % $C_{1-8}$ alcohol, or at least about 50.0 wt. % $C_{1-8}$ alcohol, or at least about 60.0 wt. % $C_{1-8}$ alcohol, or at least about 65.0 wt. % $C_{1-8}$ alcohol, or at least about 70.0 wt. % $C_{1-8}$ alcohol, or at least about 80.0 wt. % $C_{1-8}$ alcohol, or at least about 85.0 wt. % $C_{1-8}$ alcohol, or at least about 90.0 wt. % $C_{1-8}$ alcohol, based on the total weight of the disinfecting composition. In some exemplary embodiments, the disinfecting composition comprises from about 20.0 to about 70.0 wt. % $C_{1-8}$ alcohol or from about 30.0 to about 60.0 wt. % $C_{1-8}$ alcohol, based on the total weight of the disinfecting composition. In one exemplary embodiment, the disinfecting composition comprises from about 35.0 to about 55.0 wt.

% $C_{1-8}$ alcohol, based on the total weight of the disinfecting composition. In one exemplary embodiment, the disinfecting composition comprises from about 40.0 to about 50.0 wt. % $C_{1-8}$ alcohol, based on the total weight of the disinfecting composition. In another exemplary embodiment, the disinfecting composition comprises from about 42.0 to about 48.0 wt. % $C_{1-8}$ alcohol, based on the total weight of the disinfecting composition. More or less alcohol may be required in certain instances, depending particularly on other ingredients and/or the amounts thereof employed in the disinfecting composition.

In some exemplary embodiments, the disinfecting composition comprises one or more carriers. The carrier can be any suitable compound able to effectively deliver and/or transport the disinfecting composition. In some exemplary embodiments, the carrier is water or a base cleaner. Other carriers, such as saline, inorganic salt solutions, fatty esters, ethers, amides, acetates, silicones, triglycerides, and various hydrocarbons. In other exemplary embodiments, the disinfecting composition does not include any carrier and is delivered as a concentrate.

In some exemplary embodiments, the disinfecting composition includes water as the carrier. In some exemplary embodiments, the disinfecting composition comprises at least about 1.0 wt. % of a carrier, or at least about 10.0 wt. % of a carrier, or at least about 20.0 wt. % of a carrier, or at least about 30.0 wt. % of a carrier, or at least about 35.0 wt. % of a carrier, or at least about 40.0 wt. % of a carrier, or at least about 50.0 wt. % of a carrier, or at least about 60.0 wt. % of a carrier, or at least about 70.0 wt. % of a carrier, or at least about 80.0 wt. % of a carrier, or at least about 85.0 wt. % of a carrier, based on the total weight of the disinfecting composition. In some exemplary embodiments, the disinfecting composition comprises from about 30.0 wt. % to about 60.0 wt. % of a carrier, or from about 35.0 to about 55.0 wt. % of a carrier, or from about 40.0 to about 50.0 wt. % of a carrier, based on the total weight of the disinfecting composition. More or less of a carrier may be required in certain instances, depending particularly on other ingredients and/or the amounts thereof employed in the disinfecting composition.

In some exemplary embodiments, the disinfecting composition further comprises one or more surfactants. The surfactant can be any type of surfactant, including, but not limited to, nonionic surfactants, cationic surfactants, zwitterionic surfactants, amphoteric surfactants, and anionic surfactants. Nonionic surfactants, i.e., surfactants which are uncharged (neutral) and without cationic or anionic sites can be used. The surfactant can also be an anionic surfactant, which carry a negative charge and ionize in solution. The surfactant can also be a cationic surfactant, which carry a positive charge and ionize in solution. The surfactant can also be an amphoteric surfactant, which have the ability to be anionic (negatively charged), cationic (positively charged), or nonionic (uncharged, neutral) in solution depending on the pH. The surfactant can also be a zwitterionic surfactant, which is a neutral molecule with both positive and negative charges. These surfactants have both ionic states simultaneously. In some exemplary embodiments, the disinfecting composition comprises a mixture of different types of surfactants (e.g., one or more anionic surfactants and one or more non-ionic surfactants). In other exemplary embodiments, the disinfecting composition comprises a mixture of the same type of surfactants (e.g., a mixture of non-ionic surfactants). In another exemplary embodiment, the disinfecting composition comprises a mixture of an anionic surfactant, a non-ionic surfactant, and an amphoteric surfactant.

In some exemplary embodiments, the surfactant is one that comprises a sulfate or sulfonate group on one end of the surfactant molecule (these molecules are referred to herein as "sulfate surfactants"). The surfactant can include any number of other functional groups in addition to the sulfate or sulfonate groups. In some exemplary embodiments, the sulfate/sulfonate surfactant includes a hydrophobic end, such as a long hydrocarbon chain. Examples of these compounds include alkylbenzene sulfonates, alkyl sulfates, and alkyl ether sulfates. In other exemplary embodiments, the surfactant is one that has two hydrophobic tails, such as sulfosuccinates. In some exemplary embodiments, the surfactant is one or more of sodium laureth sulfate, sodium coco sulfate, sodium lauryl ether sulfate, sodium cocoyl sulfate, sodium trideceth sulfate, lignosulfonates, and sodium lauryl sulfate. A number of these surfactants are available from BASF SE of Ludwigshafen, Germany, under the tradename Texapon®. While the sodium versions of these molecules are listed herein, it is to be appreciated that any other suitable counter-ion can be used, such as ammonium. In some exemplary embodiments, the surfactant is sodium laureth sulfate.

In some other exemplary embodiments, the surfactant is a glycoside, which is a molecule formed from a simple sugar and an addition compound though replacement of a hydroxyl group on the sugar (these molecules are referred to herein as "glycoside surfactants"). In some exemplary embodiments, the simple sugar in the glycoside is glucose. These compounds are commonly referred to as glucosides. In some exemplary embodiments, the glucoside surfactant includes a hydrophobic end, such as a long hydrocarbon chain. The surfactant can include any number of other functional groups in addition to the simple sugar that is attached to the hydrophobic end. In some exemplary embodiments, the surfactant is a polyglucoside, such as an alkylpolyglucoside, including a $C_8$-$C_{16}$ alkylpolyglucoside. The surfactant can be any type of alkylpolyglucoside and can contain any number of carbon atoms and additional functional groups. In some exemplary embodiments, the surfactant is one or more of coco-glucoside, lauryl glucoside, caprylyl capryl glucoside, and decyl glucoside. A number of these surfactants are available from BASF SE under the tradename Plantacare®. In some exemplary embodiments, the surfactant is a $C_8$-$C_{16}$ alkylpolyglucoside, such as coco-glucoside.

In some other exemplary embodiments, the surfactant contains at least one betaine group (these molecules are referred to herein as "betaine surfactants"). The betaine group can be any neutral compound with a positively charged cationic functional group. In some exemplary embodiments, the cationic functional group is a quaternary ammonium or a phosphonium cation. The betaine surfactant can include any number of other functional groups in addition to the positively charged cationic functional group. In some exemplary embodiments, the surfactant is one or more of cocamidopropyl betaine, lauryl betaine, myristyl betaine, coco-betaine, lauramidopropyl betaine, oleyl betaine, capric amidopropyl betaine, myristic amidopropyl betaine, and soyamidopropyl betaine. A number of these surfactants are available from BASF SE under the tradename Dehyton®. In some exemplary embodiments, the surfactant is cocamidopropyl betaine.

Other non-limiting exemplary examples of surfactants include sodium cocoyl isothionate, sodium cocoyl glycinate, cocamidopropyl hydroxysultaine, PEG-80 sorbitan laurate, di-alkyl sulfosuccinate, disodium cocoamphodiacetate, and PEG-80 sodium laurate.

In some exemplary embodiments, the surfactant is a mixture of one or more sulfate surfactants, one or more glycoside surfactants, and one or more betaine surfactants. In some exemplary embodiments, the surfactant is a mixture of sodium laureth sulfate, cocamidopropyl betaine, and a $C_8$-$C_{16}$ alkylpolyglucoside.

In some exemplary embodiments, the surfactant or mixture of various surfactants is chosen such that the total quantity (anionic and non-ionic) of ethoxylated surfactants does not exceed 50% (of the mass of the alcohol active material) of the total quantity of surfactants. In other exemplary embodiments, the surfactant or mixture of various surfactants is chosen such that the total quantity (anionic and non-ionic) of ethoxylated surfactants does not exceed 30% (of the mass of the alcohol active material) of the total quantity of surfactants. In other exemplary embodiments, all surfactants in the disinfecting composition are ethoxylated less than 8 times. In still other exemplary embodiments, all surfactants in the disinfecting composition are of natural origin as defined by ECOCERT. These conditions are satisfied in the disinfecting composition to meet one or more of the ECOCERT labeling requirements.

As will be appreciated by one of skill in the art, the total amount of surfactant will vary depending upon a number of factors, including the amount of other ingredients in the disinfecting composition. In some exemplary embodiments, the disinfecting composition includes at least about 0.5 wt. %, or at least about 0.75 wt. %, or at least about 1.0 wt. %, or at least about 2.0 wt. % of one or more surfactants, based on the total weight of the disinfecting composition. In one or more exemplary embodiments, the disinfecting composition comprises up to about 25.0 wt. %, or up to about 18.0 wt. %, or up to about 15.0 wt. %, or up to about 12.0 wt. %, or up to about 9.0 wt. % of one or more surfactants, based on the total weight of the disinfecting composition. In other exemplary embodiments, the disinfecting composition includes from about 2.0 wt. % to about 20.0 wt. %, or from about 2.5 wt. % to about 18.0 wt. %, or from about 3.0 wt. % to about 13.0 wt. % of one or more surfactants, based on the total weight of the disinfecting composition.

As previously discussed, the total surfactant package can be comprised of any number of individual surfactants. Each of the individual surfactants can be added in any amounts such that the total amount of the surfactant aligns with the ranges disclosed herein. In some exemplary embodiments, each of the individual surfactants is added in an amount less than about 10.0 wt. %, or less than about 7.5 wt. %, or less than about 5.0 wt. %, or less than about 3.5 wt. %, or less than about 3.0 wt. %, or less than about 2.8 wt. %, or less than about 2.0 wt. %, or less than 1.5 wt. %, or less than 1.0 wt. %, based on the total weight of the disinfecting composition. In some exemplary embodiments, each of the individual surfactants is added in the same, or about the same, or substantially the same, amount in the disinfecting composition. In other exemplary embodiments, the individual surfactants are added in different amounts from one another in the disinfecting composition. In some exemplary embodiments, the disinfecting composition comprises a mixture of at least 2 surfactants, or at least 3 surfactants, or at least 4 surfactants, or at least 5 surfactants, or at least 6 surfactants.

In some exemplary embodiments, the combination of at least three surfactants increases the efficacy of the alcohol against pathogens. This combination of at least three surfactants allows the alcohol to have direct access to the particular pathogen. This occurs because the surfactant combination sufficiently surrounds and breaks apart the dirt/soil, which allows the alcohol to act directly on the pathogen instead of being blocked by the soil/dirt. Conversely, when less than three surfactants are used in the disinfecting composition, access to the pathogen is more difficult because the soil/dirt is not sufficiently surrounded and broken up and consequently, the efficacy of the alcohol is reduced.

In some exemplary embodiments, mixing low amounts (such as those discussed above) of at least 3, or at least 4, or at least 5, or at least 6 individual surfactants helps the disinfecting composition achieve a lower/better classification for the European Classification, Labeling, and Packaging (CLP) regulation than using a single surfactant at a higher concentration. The CLP regulation is a European regulation promulgated in 2008 which adopted the Globally Harmonized System (GHS) for classification of chemical compositions. The GHS in an international hazard communication approach that provides criteria for classification of chemical hazards and standardizes labeling of elements and safety data sheets. In some exemplary embodiments, the disinfecting composition is classified as only GHS07/H319 (irritation to eyes) and GHS02/H225 (flammable). In some exemplary embodiments, the disinfecting composition is classified as only GHS07/H319 (irritation to eyes). In some exemplary embodiments, the disinfecting composition is not classified under any GHS environmental classification. In other exemplary embodiments, the disinfecting composition is not classified under any GHS classification.

In some exemplary embodiments, the disinfecting composition includes one or more chelating agents. The chelating agent is not particularly limited and can include any central atom with two or more coordinate bonds between a polydentate ligand. Both organic and inorganic chelating agents can be used in the disinfecting composition. In some exemplary embodiments, the chelating agent comprises one or more of ethylenediamine, ethylenediaminetetraacetic acid (EDTA) and its salts, salicylic acid, polyphosphates, ascorbic acid. In some exemplary embodiments, the chelating agent is L-glutamic acid N,N-diacetic acid, tetrasodium salt (GLDA). A number of these GLDA chelating agents are sold by Akzo Nobel of Amsterdam, Netherlands under the tradename Dissolvine®. In some exemplary embodiments, the chelating agent is chosen to ensure the disinfecting composition is ECOCERT compliant. In some exemplary embodiments, the chelating agent also helps to inhibit scale and scum and also acts a boosting agent.

In some exemplary embodiments, the chelating agent is added in the disinfecting composition in an amount up to about 10.0 wt %, or up to about 5.0 wt. %, or about 2.5 wt. %, or about 1.5 wt. %, or about 1.0 wt. %, or about 0.75 wt. %, or about 0.5 wt. %, based on the weight of the disinfecting composition. In some exemplary embodiments, the chelating agent is included in an amount of at least about 0.001 wt. %, or at least about 0.01 wt. %, or at least about 0.05 wt. %, or at least about 0.1 wt. %, or at least about 0.5 wt. %, or at least about 0.7 wt. %, based on the weight of the disinfecting composition. In some exemplary embodiments the chelating agent is added from about 0.001 to about 3.0 wt. %, or from about 0.005 to about 2.0 wt. %, or from about 0.01 to about 1.5 wt. %, or from about 0.1 to about 1.0 wt. %, or from about 0.25 to about 0.75 wt. %, based on the weight of the disinfecting composition.

In some exemplary embodiments, the disinfecting composition further comprises a solubilizing agent. The solubilizing agent is not particularly limited and can include any compound which increases the solubility of the various ingredients in the disinfecting composition. In some exemplary embodiments, the solubilizing agent is a member of the glycol ether family. In some exemplary embodiments, the glycol ether is formed from the combination of any suitable alcohol and ethylene oxide. In some exemplary embodiments, the solubilizing agent is propylene glycol, butylglycol, butyldiglycol, diethylene glycol, methoxypropanol, methyldiglycol, ethylene glycol, and the like. In some exemplary embodiments the solubilizing agent is a nonionic surfactant and/or an alcohol. In some exemplary embodiments, the solubilizing agent is propylene glycol (propane-1,2-diol).

In some exemplary embodiments, the solubilizing agent also acts as a stabilizer and distributor for the other ingredients in the disinfecting composition, allowing them to retain their functions even at lower temperatures. In some exemplary embodiments, the use of propylene glycol as the solubilizing agent also increases overall efficacy of the product.

In some exemplary embodiments, the solubilizing agent is added in the disinfecting composition in an amount up to about 10.0 wt. %, or up to about 5.0 wt. %, or about 2.5 wt. %, or about 1.5 wt. %, or about 1.0 wt. %, or about 0.75 wt. %, or about 0.5 wt. %, based on the weight of the disinfecting composition. In some exemplary embodiments, the solubilizing agent is included in an amount of at least about 0.001 wt. %, or at least about 0.01 wt. %, or at least about 0.05 wt. %, or at least about 0.1 wt. %, or at least about 0.5 wt. %, or at least about 0.7 wt. %, based on the weight of the disinfecting composition. In some exemplary embodiments the solubilizing agent is added from about 0.01 to about 5.0 wt. %, or from about 0.1 to about 3.0 wt. %, or from about 0.25 to about 2.5 wt. %, or from about 0.5 to about 2.0 wt. %, or from about 0.75 to about 1.8 wt. %, based on the weight of the disinfecting composition.

In some exemplary embodiments, the disinfecting composition further comprises a pH adjuster. The pH adjuster is not particularly limited and can be selected based on the composition of the disinfecting composition, such as, specifically, the percentage of alcohol in the system. The pH adjuster can be an acid or base and in this way can be used to adjust the pH in either direction (i.e., make the composition more acidic or more basic). In some exemplary embodiments, the pH adjuster is a long chain hydrocarbon with two or more carbon atoms. The hydrocarbon can be branched or straight and can also be cyclic or linear. The hydrocarbon can have any number of various other functional groups including, but not limited to, amines, esters, carboxylic acids, ethers, amides, alkyl halides, alcohols, phenyls, as well as other carbonyl-containing functional groups. The hydrocarbon molecule can be anionic, cationic, or non-ionic.

In some exemplary embodiments the pH adjuster is an acidic compound, that lowers the pH of the composition. Exemplary acidic pH adjusters include, but are not limited to, organic acids, mineral acids, and inorganic acids. In some exemplary embodiments, the acid is citric acid, lactic acid, formic acid, acetic acid, proponic acid, butyric acid, caproic acid, oxalic acid, maleic acid, benzoic acid, malonic acid, glycolic acid, propanoic acid, tartaric acid, carbonic acid, adipic acid, benzene 1,3,5 tricarboxylic acid, chlorosuccinic acid, choline chloride, cw-aconitic acid, citramalic acid, cyclobutane 1,1,3,3 tetracarboxylic acid, cyclohexane 1,2,4,5 tetracarboxylic acid, cyclopentane 1,2,3,4 tetracarboxylic acid, diglycolic acid, fumaric acid, glutamic acid, glutaric acid, glyoxylic acid, isocitric acid, ketomalonic acid, malic acid, nitrilotriacetic acid, oxalacetic acid, phytic acid, p-toluenesulfonic acid, salicylic acid, succinic acid, tartronic acid, tetrahydrofuran 2,3,4,5 tetracarboxylic acid, tricarballylic acid, versene acids, 3-hydroxyglutaric acid, 2-hydroxypropane 1,3 dicarboxylic acid, glyceric acid, furan 2,5 dicarboxylic acid, 3,4-dihydroxyfuran-2,5 dicarboxylic acid, 3,4-dihydroxytetrahydrofuran-2,5-dicarboxylic acid, 2-oxo-glutaric acid, glyceric acid, and 2,5 furandicarboxylic acid. In some exemplary embodiments, the pH adjuster is citric acid.

In some exemplary embodiments, the disinfecting composition comprises at least about 0.005 wt. % of the pH adjuster, or at least about 0.01 wt. %, or at least about 0.02 wt. %, or at least about 0.04 wt. %, or at least about 0.06 wt. %, or at least about 0.08 wt. %, or at least about 0.1 wt. %, or at least about 0.5 wt. %, or at least about 0.7 wt. %, or at least about 1.0 wt. %, or at least about 1.5 wt. %, or at least about 2.0 wt. %, or at least about 5.0 wt. % of the pH adjuster, based on the total weight of the disinfecting composition. In some exemplary embodiments, the disinfecting composition comprises from about 0.05 wt. % to about 5.0 wt. % of the pH adjuster, or from about 0.1 wt. % to about 3.5 wt. % of the pH adjuster, or from about 0.5 wt. % to about 3.0 wt. % of the pH adjuster, or from about 1.0 wt. % to about 2.5 wt. % of the pH adjuster, or from about 1.2 to about 2.0 wt. % of the pH adjuster, based on the total weight of the disinfecting composition.

In some exemplary embodiments, the disinfecting composition further comprises a fragrance. Any scent may be used in the disinfecting composition including, but not limited to, any scent classification on a standard fragrance chart, such as floral, oriental, woody, and fresh. Exemplary scents include cinnamon, clove, lavender, peppermint, rosemary, thyme, thieves, lemon, citrus, coconut, apricot, plum, watermelon, ginger, cranberry, and combinations thereof.

In some exemplary embodiments, the fragrance is included in the disinfecting composition in an amount from about 0.005 wt. % to about 5.0 wt. %, in other embodiments, from about 0.01 wt. % to about 3.0 wt. %, and in other embodiments, from about 0.05 wt. % to about 1.0 wt. %, based on the total weight of the disinfecting composition. The fragrance can be any made of any perfume, essential oil, aroma compounds, fixatives, terpenes, solvents, and the like. In some exemplary embodiments, the essential oils may include, for example, one or more of Limonene, Citrus Aurantium Dulcis (Orange) Peel Oil, Eucalyptus Globulus Leaf Oil, Citrus Grandis (Grapefruit) Peel Oil, Linalool, Litsea Cubeba Fruit Oil, Lavandula Hybrida Oil, Abies Sibirica Oil, Mentha Citrata Leaf Extract, Coriandrum Sativum (Coriander) Fruit Oil, Piper Nigrum (Pepper) Fruit Oil, and Canarium Luzonicum Gum Nonvolatiles.

The disinfecting composition may further comprise a wide range of optional ingredients that do not deleteriously affect the composition's efficacy. For example, the disinfecting composition can further comprise abrasives, anticaking agents, antioxidants, binders, biological additives, bulking agents, chemical additives; colorants, denaturants, drug astringents, emulsifiers, external analgesics, film formers, opacifying agents, plasticizers, preservatives (sometimes referred to as antimicrobials), propellants, reducing agents, solvents, surfactants, foam boosters, hydrotropes, solubilizing agents, suspending agents (nonsurfactant), detackifiers, dyes, and viscosity increasing agents (aqueous and nonaqueous). Examples of other functional classes of materials useful herein that are well known to one of ordinary skill in the art include solubilizing agents, sequestrants, keratolytics, and the like.

In some exemplary embodiments, the disinfecting composition is essentially free of, or completely free of, peroxides, such as hydrogen peroxide. Hydrogen peroxide is an unstable compound that reduces the shelf life of compositions which it is included in. Hydrogen peroxide is also an eye and skin irritant. By "essentially free of peroxides" it is meant that the disinfecting composition contains no greater than 5.0 wt. %, preferably no greater than 1.0 wt. %, and more preferably no greater than 0.5 wt. % peroxides.

In some exemplary embodiments, the disinfecting composition is essentially free of, or completely free of, peracetic acid. By "essentially free of peroxides" it is meant that the disinfecting composition contains no greater than 5.0 wt. %, preferably no greater than 1.0 wt. %, and more preferably no greater than 0.5 wt. % peracetic acid. In some exemplary embodiments, the disinfecting composition is essentially free of, or completely free of, phosphonate surfactants. By "essentially free of phosphonate surfactants" it is meant that the disinfecting composition contains no greater than 5.0 wt. %, preferably no greater than 1.0 wt. %, and more preferably no greater than 0.5 wt. % phosphonate surfactants.

The pH of the disinfecting composition is not particularly limited. In some exemplary embodiments, the pH can range from about 1.0 to about 12.0. In some exemplary embodiments, the pH ranges from about 2.0 to about 9.0, or from about 2.5 to about 6.5, or from about 2.7 to about 5.5. In some exemplary embodiments, the pH ranges from about 3.0 to about 4.0. In some exemplary embodiments, the pH ranges from about 3.2 to about 3.8, or from about 3.4 to about 3.6. In some exemplary embodiments, the pH of the disinfecting composition is less than or equal to 6.5, less than or equal to 5.5, less than or equal to 4.5, less than or equal to 4.0, or less than or equal to 3.8, or less than or equal to 3.5. In some exemplary embodiments, the efficacy of the disinfecting composition increases when the pH is from about 3.0 to about 4.0, and especially when the pH is from about 3.2 to about 3.8, as compared to an otherwise identical disinfecting composition with a pH outside of these ranges.

In some exemplary embodiments, the disinfecting composition comprises at least 20.0 wt. % of one or more $C_{1-8}$ alcohols and at least three surfactants. In some exemplary embodiments, the one or more $C_{1-8}$ alcohols are added in an amount from about 20.0 to about 70.0 wt. % or about 35.0 to about 50.0 wt. %, based on the weight of the disinfecting composition. In some exemplary embodiments, the surfactants include one or more of anionic surfactants, nonionic surfactants, and amphoteric surfactants. In some exemplary embodiments, these surfactants are each present in an amount below about 5.0 wt. %, or about 3.5 wt. % or about 2.8 wt. %, based on the total weight of the disinfecting composition. In some exemplary embodiments, all the surfactants in the disinfecting composition are certified natural by ECOCERT.

In some exemplary embodiments, the disinfecting composition further comprises a pH adjuster such as an organic acid. In some exemplary embodiments the disinfecting composition further comprises a chelating agent such as L-glutamic acid N,N-diacetic acid, tetrasodium salt (GLDA). In some exemplary embodiments, the disinfecting composition further comprises a solubilizing agent, such as propylene glycol. In some exemplary embodiments, the disinfecting composition comprises a carrier such as water.

In some exemplary embodiments, the disinfecting composition is essentially free of hydrogen peroxide and/or peracetic acid.

In some exemplary embodiments, the disinfecting composition comprises at least 20.0 wt. % of one or more $C_{1-8}$ alcohols and at least three surfactants.

In some exemplary embodiments, the disinfecting composition comprises at least 20.0 wt. % of one or more $C_{1-8}$ alcohols, a chelating agent, and at least one anionic surfactant, at least one non-ionic surfactant, and at least one amphoteric surfactant. In some exemplary embodiments, this composition further comprises a pH adjuster, water and/or a solubilizing agent.

In some exemplary embodiments, the disinfecting composition comprises at least 20.0 wt. % of one or more $C_{1-8}$ alcohols, a pH adjuster, at least three surfactants, where each of the three surfactants has one or more of a betaine group, a sulfate group, and a glucose group. In some exemplary embodiments, this composition further comprises a chelating agent, water and/or a solubilizing agent.

In some exemplary embodiments, the disinfecting composition reduces the number of viable bacterial cells according to the methods set forth in the NF EN 1276 (March 2010) test standard ("EN 1276") at a concentration of at least 0.1%. The EN 1276 standard is a European quantitative suspension test method designed to evaluate the bactericidal activity of a chemical disinfectant product under various conditions. Test organisms *Staphylococcus aureus*, *Pseudomonas aeruginosa*, *Enterococcus hirae*, and *Escherichia coli* are used to evaluate the particular disinfectant. Generally, a disinfectant must achieve a 5-log reduction in the number of viable bacterial cells after exposure for less than 5 minutes to pass the EN 1276 standard. The EN 1276 standard, is available under license from ANFOR—Norm'Info of Rue Francis de Pressense, France, the entirety of which is incorporated herein by reference. In some exemplary embodiments, the disinfecting composition is able to achieve at least a 3-log reduction, or at least a 3.5-log reduction, or at least a 4-log reduction, or at least a 4.5-log reduction, or at least a 5-log reduction, or at least a 5.11-log reduction, or at least a 5.33-log reduction, or at least a 5.42-log reduction in the of viable bacterial cells according to the methods set forth in the EN 1276 standard at a concentration of at least 0.1% or at least 40% or at least 80%. In some exemplary embodiments, the disinfecting composition passes the EN 1276 standard for bacterial efficacy at a concentration of at least 40% or at least 80%. In some exemplary embodiments, the disinfecting composition passes the EN 1276 at these concentrations after a contact time of about 1 minute.

In some exemplary embodiments, the disinfecting composition reduces the number of viable bacterial cells according to the methods set forth in the NF EN 13727 (March 2010) test standard ("EN 13727") at a concentration of at least 0.1%. The EN 13727 standard is a European quantitative suspension test method designed to evaluate the bactericidal activity of a chemical disinfectant product for instruments used in the medical area. Test organisms *Staphylococcus aureus, Pseudomonas aeruginosa*, and *Enterococcus hirae* are used to evaluate the particular disinfectant. Generally, a disinfectant must achieve a 5-log reduction in the number of viable bacterial cells after exposure for between 1 and 5 minutes to pass the EN 13727 standard. The EN 13727 standard is available under license from ANFOR—Norm'Info of Rue Francis de Pressense, France, the entirety of which is incorporated herein by reference. In some exemplary embodiments, the disinfecting composition is able to achieve at least a 3-log reduction, or at least a 3.5-log reduction, or at least a 4-log reduction, or at least a 4.5 log reduction, or at least a 5-log reduction, or at least a 5.15-log reduction, or at least a 5.28-log reduction, or at least a 5.31-log reduction in the of viable bacterial cells according to the methods set forth in the EN 13727 standard at a concentration of at least about 0.1% or at least 40% or at least 80%. In some exemplary embodiments, the disinfecting composition passes the EN 13727 standard for bacterial efficacy a concentration of at least 40% or at least 80%. In some exemplary embodiments, the disinfecting composition passes the EN 13727 at these concentrations after a contact time of about 1 minute.

In some exemplary embodiments, the disinfecting composition reduces the number of viable fungicidal/yeasticidial cells according to the methods set forth in the NF EN 1650 (March 2010) test standard ("EN 1650") at a concentration of at least 0.1%. The EN 1650 standard is a European quantitative suspension test method designed to evaluate the fungicidal/yeasticidial activity/efficacy of a chemical disinfectant product under various conditions. Particularly, the EN 1650 standard measures the efficacy of the chemical disinfectant in food, industrial, domestic, and institutional areas. The test organism *Candida albicans* is used to evaluate the particular disinfectant. Generally, a disinfectant must achieve a 4-log reduction in the number of viable fungicidal/yeasticidial cells after exposure for less than 15 minutes to pass the EN 1650 standard. The EN 1650 standard is available under license from ANFOR—Norm'Info of Rue Francis de Pressense, France, the entirety of which is incorporated herein by reference. In some exemplary embodiments, the disinfecting composition is able to achieve at least a 2.5 log reduction, or at least a 3-log reduction, or at least a 3.5-log reduction, or at least a 4-log reduction, or at least a 4.5-log reduction, or at least a 4.52 log-reduction, or at least a 5-log reduction in the of viable fungicidal/yeasticidial cells according to the methods set forth in the EN 1650 standard at a concentration of at least 0.1% or at least 40% or at least 80%. In some exemplary embodiments, the disinfecting composition passes the EN 1650 standard for fungicidal/yeasticidial efficacy at a concentration of at least 80%. In some exemplary embodiments, the disinfecting composition passes the EN 1650 at these concentrations after a contact time of about 1 minute.

In some exemplary embodiments, the disinfecting composition reduces the number of viable fungicidal/yeasticidial cells according to the methods set forth in the NF EN 13624 (November 2013) test standard ("EN 13624") at a concentration of at least 0.1%. The EN 13624 standard is a European quantitative suspension test method designed to evaluate the fungicidal/yeasticidial activity of a chemical disinfectant product for instruments used in the medical area. The test organism *Candida albicans* is used to evaluate the particular disinfectant. Generally, a disinfectant must achieve at least a 4-log reduction in the number of viable fungicidal/yeasticidial cells after exposure less than 15 minutes to pass the EN 13624 standard. The EN 13624 standard is available under license from ANFOR—Norm'Info of Rue Francis de Pressense, France, the entirety of which is incorporated herein by reference. In some exemplary embodiments, the disinfecting composition is able to achieve at least a 1.5-log reduction, or at least a 1.88-log reduction, or at least a 2-log reduction, or at least a 2.5-log reduction, or at least a 3-log reduction, or at least a 3.5-log reduction, or at least a 4-log reduction, or at least a 4.25-log reduction, or at least a 4.5-log reduction, or at least a 5-log reduction in the of viable fungicidal/yeasticidial cells according to the methods set forth in the EN 13624 standard at a concentration of at least 0.1% or at least 40% or at least 80%. In some exemplary embodiments, the disinfecting composition passes the EN 13624 standard for fungicidal/yeasticidial efficacy at a concentration of at least 80%. In some exemplary embodiments, the disinfecting composition passes the EN 13624 at these concentrations after a contact time of about 1 minute.

In some exemplary embodiments, the disinfecting composition reduces the number of viable bacterial, yeasticidial, and/or fungicidal cells according to the methods set forth in the NF EN 13697 (June 2015) test standard ("EN 13697") at a concentration of at least 0.1%. The EN 13697 standard is a European quantitative surface test method designed to evaluate the efficacy of a chemical disinfectant product on surfaces. The test organisms *Staphylococcus aureus*, *Pseudomonas aeruginosa*, *Enterococcus hirae*, *Escherichia coli*, and *Candida albicans*, are used to evaluate the particular disinfectant. Generally, a disinfectant must achieve at least a 4-log reduction in the number of viable bacterial cells after exposure less than 5 minutes and at least a 3-log reduction in fungicidal cells in less than 15 minutes to pass the EN 13697 standard. The EN 13697 standard is available under license from ANFOR—Norm'Info of Rue Francis de Pressense, France, the entirety of which is incorporated herein by reference. In some exemplary embodiments, the disinfecting composition is able to achieve at least a 2.83-log reduction, or at least a 2.94-log reduction, or at least a 3-log reduction, or at least a 3.5-log reduction, or at least a 4-log reduction, or at least a 4.5-log reduction, or at least a 5-log reduction, or at least a 5.5-log reduction, or at least a 5.59-log reduction, or at least a 6-log reduction, or at least a 6.5-log reduction, or at least a 6.68-log reduction, or at least a 6.95-log reduction in the of viable bacterial, yeasticidial, and/or fungicidal cells according to the methods set forth in the EN 13697 standard at a concentration of at least 0.1% or at least 50% or at least 100%. In some exemplary embodiments, the disinfecting composition passes the EN 13697 standard for efficacy at a concentration of 100%. In some exemplary embodiments, the disinfecting composition passes the EN 13697 at these concentrations after a contact time of about 1 minute.

In some exemplary embodiments, the disinfecting composition is able to pass one or more of the following European standards after a contact time of less or equal to about 1 minute: EN 13697, EN 13727, EN 1275, EN 1650, and EN 13624. In some exemplary embodiments, the disinfecting composition is able to pass at least 2, or at least 3, or at least 4 of these European standards after a contact time of less than or equal to about 1 minute. In some exemplary embodiments, the disinfecting composition is able to pass all five European standards after a contact time of less than or equal to about 1 minute. While the European standards generally require particular efficacies at 5 or even 15 minutes of contact time, the disinfecting compositions according to the exemplary embodiments disclosed herein were surprisingly able to pass the same standards at contact times of less than or equal to about 1 minute.

EXAMPLES

The following examples are included for purposes of illustration and are not intended to limit the scope of the methods or compositions described herein.

Example 1

Composition A was tested for its ability to kill bacterial strains according to the test methods and procedures of the EN 1276 test standard. Composition A is described in Table 1.

TABLE 1

| Chemical | Wt. % |
|---|---|
| Water | 44.20 |
| Ethanol 96% | 45.0 |
| Sodium Laureth Sulfate | 2.8 |
| Alkylpolyglucoside(C8-C16) | 2.0 |
| Cocamidopropyl Betaine | 2.0 |
| L-glutamic acid, N,N-diacetic acid, tetrasodium salt (Tetrasodium glutamate diacetate) | 0.5 |
| Propylene glycol (Propane-1,2-diol) | 1.6 |
| Citric Acid | 1.9 |

The bacterial efficacy of Composition A was tested at concentrations of 80%, 40%, and 0.10%, each diluted in hard water (375 mg/kg $CaCO_3$). Contact time was set at 1 minute±5 seconds. The efficacy trials were tested in a mixture of bovine proteins at 3 g/L and the tests were run at 20° C. for each concentration.

The results are reported in Table 2, which shows the log reduction in viable bacterial cells after 1 minute of exposure to Composition A.

TABLE 2

Reduction in the concentration of number of viable cells

| Test strain | Concentration | | | | | |
|---|---|---|---|---|---|---|
| | 80% | | 40% | | 0.10% | |
| | Time of contact | | | | | |
| | 1 minute | | 1 minute | | 1 minute | |
| | Log reduction | | Log reduction | | Log reduction | |
| Pseudomonas aeruginosa | Log R | >5.50 | Log R | >5.42 | Log R | <4.05 |
| Staphylococcus aureus | Log R | >5.33 | Log R | >5.33 | Log R | <3.96 |
| Escherichia coli | Log R | >5.50 | Log R | >5.50 | Log R | <4.13 |
| Enterococcus hirae | Log R | >5.11 | Log R | >5.13 | Log R | <3.74 |

The results in Table 2 show that Composition A, at concentrations of 40% and 80% in water, was able to pass the EN 1276 standard, which requires at least a 5-log reduction in the number of viable bacteria after less than 5 minutes of exposure. Particularly, Composition A, at concentrations of 40% and 80%, were able to pass the EN 1276 standard and achieve log kills of at least 5.13 for all bacterial strains tested.

Example 2

Composition A was tested for its ability to kill bacterial strains on medical related instruments/equipment according to the test methods and procedures of the EN 13727 test standard.

The bacterial efficacy of Composition A was tested at concentrations of 80%, 40%, and 0.10% each diluted in hard water (375 mg/kg $CaCO_3$). Contact time was set at 1 minute±5 seconds. The efficacy trials were tested in a mixture of bovine proteins at 3 g/L and sheep erythrocytes at 3 mL/L and the tests were run at 20° C. for each concentration.

The results are reported in Table 3, which shows the log reduction in viable bacterial cells after 1 minute of exposure to Composition A.

TABLE 3

Reduction in the concentration of number of viable cells

| Test strain | Concentration | | | | | |
|---|---|---|---|---|---|---|
| | 80% | | 40% | | 0.10% | |
| | Time of contact | | | | | |
| | 1 minute | | 1 minute | | 1 minute | |
| | Log reduction | | Log reduction | | Log reduction | |
| Pseudomonas aeruginosa | Log R | >5.28 | Log R | >5.28 | Log R | <2.91 |
| Staphylococcus aureus | Log R | >5.31 | Log R | >5.31 | Log R | <2.94 |
| Enterococcus hirae | Log R | >5.15 | Log R | >5.15 | Log R | <2.78 |

The results in Table 3 show that Composition A, at concentrations of 40% and 80% in water, was able to pass the EN 13727 standard, which requires a 5-log reduction in the number of viable bacteria after 1-5 minutes of exposure. Particularly, Composition A, at concentrations of 40% and 80%, was able to pass the EN 13727 standard and achieve log kills of at least 5.15 for all bacterial strains tested.

Example 3

Composition A was tested for its ability to kill a fungus/yeast strain according to the test methods and procedures of the EN 1650 test standard.

The fungicidal/yeasticidal efficacy of composition A was tested at concentrations of 80%, 40%, and 0.10% each diluted in hard water (375 mg/kg $CaCO_3$). Contact time was set at 1 minute±5 seconds. The efficacy trials were tested in a mixture of bovine proteins at 3 g/L and the tests were run at 20° C. for each concentration.

The results are reported in Table 4, which shows the log reduction in viable cells after 1 minute of exposure to Composition A at 20° C. for each concentration.

TABLE 4

Reduction in the concentration of number of viable cells

| | Concentration | | | | | |
|---|---|---|---|---|---|---|
| | 80% | | 40% | | 0.10% | |
| | Time of contact | | | | | |
| | 1 minute | | 1 minute | | 1 minute | |
| Test strain | Log reduction | | Log reduction | | Log reduction | |
| Candida albicans | Log R | >4.52 | Log R | >3.15 | Log R | <3.15 |

The results in Table 4 show that Composition A, at a concentration of 80% in hard water, was able to pass the EN 1650 standard, which requires at least a 4-log reduction in the number of viable cells after less than 15 minutes of exposure. Particularly, Composition A, at a concentration of 80%, was able to pass the EN 1650 standard and achieve a log kill of at least 4.52 for the strain tested.

Example 4

Composition A was tested for its ability to kill a fungus/yeast strain on medical related instruments/equipment according to the test methods and procedures of the EN 13624 test standard.

The fungicidal/yeasticidal efficacy of Composition A was tested at concentrations of 80%, 40%, and 0.10% each diluted in hard water (375 mg/kg $CaCO_3$). Contact time was set at 1 minute±5 seconds. The efficacy trials were tested in a mixture of bovine proteins at 3 g/L and sheep erythrocytes at 3 mL/L and the tests were run at 20° C. for each concentration.

The results are reported in Table 5, which shows the log reduction in viable cells on the given surface after 1 minute of exposure to Composition A at 20° C. for each concentration.

TABLE 5

Reduction in the concentration of number of viable cells

| | Concentration | | | | | |
|---|---|---|---|---|---|---|
| | 80% | | 40% | | 0.10% | |
| | Time of contact | | | | | |
| | 1 minute | | 1 minute | | 1 minute | |
| Test strain | Log reduction | | Log reduction | | Log reduction | |
| Candida albicans | Log R | >4.25 | Log R | <1.88 | Log R | <1.88 |

The results in Table 5 show that Composition A, at a concentration of 80% in hard water, was able to pass the EN 13624 standard, which requires at least a 4-log reduction in the number of viable cells after less than 60 minutes of exposure. Particularly, Composition A, at a concentration of 80%, was able to pass the EN 13624 standard and achieve a log kill of at least 4.52 for the strain tested.

Example 4

Composition A was tested for its ability to kill various strains of bacteria, fungi, and yeast on surfaces according to the test methods and procedures of the EN 13697 test standard.

The efficacy of composition A was tested at concentrations of 100%, 50%, and 0.10% each diluted in hard water (375 mg/kg $CaCO_3$). Contact time was set at 1 minute±5 seconds. The efficacy trials were tested in a mixture of bovine proteins at 3 g/L and the tests were run at 20° C. for each concentration. The results are reported in Table 6, which shows the number of viable cells remaining after 1 minute of exposure at each concentration.

TABLE 6

Reduction in the concentration of number of viable cells

| | Concentration | | | | | |
|---|---|---|---|---|---|---|
| | 100% | | 50% | | 0.10% | |
| | Time of contact | | | | | |
| | 1 minute | | 1 minute | | 1 minute | |
| Test strain | Log reduction | | Log reduction | | Log reduction | |
| Pseudomonas aeruginosa | Log R | >6.55 | Log R | >4.50 | Log R | <1.13 |
| Staphylococcus aureus | Log R | >6.95 | Log R | 2.83 | Log R | <1.53 |
| Escherichia coli | Log R | >6.68 | Log R | 1.51 | Log R | <1.26 |

TABLE 6-continued

Reduction in the concentration of number of viable cells

| | Concentration | | | | | |
|---|---|---|---|---|---|---|
| | 100% | | 50% | | 0.10% | |
| | Time of contact | | | | | |
| | 1 minute | | 1 minute | | 1 minute | |
| Test strain | Log reduction | | Log reduction | | Log reduction | |
| Enterococcus hirae | Log R | >6.69 | Log R | 2.94 | Log R | <1.27 |
| Candida albicans | Log R | >5.59 | Log R | 0.63 | Log R | <0.17 |

The results in Table 6 show that Composition A, at a concentration of 100%, was able to pass the EN 13697 standard, which requires at least a 4-log reduction (bacteria) and 3-log reduction (fungi) in the number of viable cells after less than 5 minutes (bacteria) or 15 minutes (fungi) of exposure. Particularly, Composition A, at a concentration of 100%, was able to pass the EN 13697 standard and achieve a log kills of at least 6.55 for bacterial strains and a log kill of at least 2.59 for the fungicidal/yeasticidal strain.

Although exemplary embodiments have been described herein, it should be appreciated that many modifications can be made without departing from the spirit and scope of the general inventive concepts. All such modifications are intended to be included within the scope of the exemplary embodiments disclosed herein, which is to be limited only by the following claims.

The invention claimed is:

1. A disinfecting composition comprising:
    at least 20 wt. % of one or more C1-8 alcohols;
    at least three surfactants, wherein each individual surfactant is present in an amount below 5 wt. %, based on the total weight of the disinfecting composition;
    one or more chelating agents; and
    one or more pH adjusters.

2. The disinfecting composition of claim 1, wherein the at least three surfactants include at least one anionic surfactant, at least one nonionic surfactant, and at least one amphoteric surfactant.

3. The disinfecting composition of claim 1, wherein the surfactants contain one or more of a betaine group, a sulfate group, and a glucose group.

4. The disinfecting composition of claim 1, wherein the surfactants are one or more of sodium laureth sulfate, cocamidopropyl betaine, and a C8-C16 alkylpolyglucoside.

5. The disinfecting composition of claim 1, wherein the one or more C1-8 alcohols is one or more of methanol, ethanol, propanol, butanol, pentanol, hexanol, and isomers and mixtures thereof.

6. The disinfecting composition of claim 1, wherein the one or more C1-8 alcohols is ethanol.

7. The disinfecting composition of claim 1, wherein the one or more C1-8 alcohols is present in an amount from 20.0 to 70.0 wt. %, based on the weight of the disinfecting composition.

8. The disinfecting composition of claim 1, wherein the pH adjuster is an organic acid.

9. The disinfecting composition of claim 1, wherein the pH adjuster is present in an amount from 0.05 to 5.0 wt. %, based on the total weight of the disinfecting composition.

10. The disinfecting composition of claim 1, wherein the chelating agent is present in an amount from 0.001 to 3.0 wt. %, based on the total weight of the disinfecting composition.

11. The disinfecting composition of claim 1, wherein the chelating agent comprises L-glutamic acid N,N-diacetic acid, tetrasodium salt (GLDA).

12. The disinfecting composition of claim 1, wherein the disinfecting composition further comprises a solubilizing agent.

13. The disinfecting composition of claim 12, wherein the solubilizing agent is present in an amount from 0.1 to 5.0 wt. %, based on the total weight of the disinfecting composition.

14. The disinfecting composition of claim 1, wherein the individual surfactants are present an amount below 5.0 wt. %, based on the total weight of the disinfecting composition.

15. The disinfecting composition of claim 1, wherein the total quantity of ethoxylated surfactants does not exceed 50% of the total quantity of surfactants, based on the weight of the alcohol.

16. The disinfecting composition of claim 1, wherein the disinfecting composition is essentially free of hydrogen peroxide.

17. The disinfecting composition of claim 1, wherein the disinfecting composition is essentially free of peracetic acid.

18. The disinfecting composition of claim 1, wherein the disinfecting composition is essentially free of phosphonate surfactants.

19. The disinfecting composition of claim 8, wherein the organic acid comprises citric acid.

20. The disinfecting composition of claim 12, wherein the solubilizing agent comprises propylene glycol.

* * * * *